United States Patent [19]

Itami et al.

[11] Patent Number: 5,234,785
[45] Date of Patent: Aug. 10, 1993

[54] ELECTROPHOTOGRAPHIC PHOTORECEPTOR AND MANUFACTURING METHOD THEREOF

[75] Inventors: Akihiko Itami; Akira Kinoshita; Kazumasa Watanabe, all of Hachioji, Japan

[73] Assignee: Konica Corporation, Tokyo, Japan

[21] Appl. No.: 792,955

[22] Filed: Nov. 15, 1991

[30] Foreign Application Priority Data

Nov. 20, 1990 [JP] Japan ............... 2-315640

[51] Int. Cl.⁵ .................. G03G 5/047; G03G 5/06
[52] U.S. Cl. ............................... 430/58; 430/59; 430/79
[58] Field of Search ......................... 430/58, 78

[56] References Cited

U.S. PATENT DOCUMENTS

| 4,664,997 | 5/1987 | Suzuki et al. | 430/78 X |
| 4,981,767 | 1/1991 | Tokura et al. | 430/78 X |
| 5,112,711 | 5/1992 | Nguyen et al. | 430/58 |

FOREIGN PATENT DOCUMENTS

| 272272 | 11/1987 | Japan | 430/78 |
| 82046 | 3/1989 | Japan | 430/78 |
| 183261 | 7/1990 | Japan | 430/78 |
| 280169 | 11/1990 | Japan | 430/78 |

Primary Examiner—Roland Martin
Attorney, Agent, or Firm—Jordan B. Bierman

[57] ABSTRACT

An electrophotographic photoreceptor and a method for producing the same are disclosed, in which stability of coating solution of a photoreceptive layer is improved. The photoreceptor comprises a conductive support having thereon a photoreceptive layer containing a binder, a titanylphthalocyanine which has a peak in X-ray diffraction spectrum thereof by Cu-Kα ray at a Bragg angle $2\theta$ of $27.2° \pm 0.2°$, and an organic solvent soluble phthalocyanine represented by the following formula I;

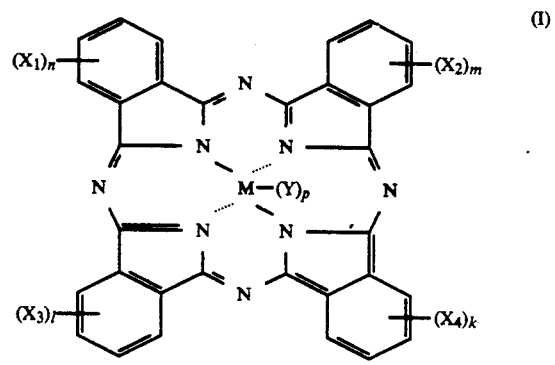

wherein $X_1$, $X_2$, $X_3$ and $X_4$ are each an alkyl group, an alkoxy group or a an aryloxy group, these groups each may have a substituent; M is a metal atom; Y is a halogen atom, an oxygen atom, a hydroxy group, an alkoxy group, an aryloxy group, an alkylthio group, an arylthio group, or a siloxy group, these organic groups may have a substituent; k, l, m and n are each an integer of 0, 1, 2, 3 or 4; and p is an integer of 0, 1 or 2.

7 Claims, 6 Drawing Sheets

ELECTROPHOTOGRAPHIC PHOTORECEPTOR AND MANUFACTURING METHOD THEREOF

FIELD OF THE INVENTION

Present invention relates to an electrophotographic photoreceptor and manufacturing method thereof.

BACKGROUND OF THE INVENTION

In recent years, photoconductive materials are actively studied, and some of them are used as photoelectric conversion elements for electrophotographic photoreceptors, solar batteries, image sensors and the like. As such photoconductive materials, inorganic materials have been mainly used up to the present. In electrophotographic photoreceptors, for example, there have been broadly used inorganic photoreceptors provided with a photosensitive layer which contains selenium, zinc oxide, or cadmium sulfide as the primary component.

However, these inorganic photoreceptors are not always satisfactory in characteristics of photosensitivity, thermal stability, moisture resistance and durability, which are essential for electrophotographic photoreceptors used in copying machines. For example, selenium is apt to lower its properties as an electrophotographic photoreceptor for its liability to crystallization by heat or stains such as finger spots.

Further, electrophotographic photoreceptors using cadmium sulfide are low in moisture resistance and durability, and electrophotographic photoreceptors using zinc oxide are insufficient in durability.

Moreover, in the growing importance of environmental preservation, electrophotographic photoreceptors of cadmium sulfide have a defect of requiring severe control in both manufacturing and handling because of its toxicity.

For improving such disadvantages of inorganic photoconductive materials, various organic photoconductive materials have come to attract much attention in the art, and a number of approaches are being made to utilize them in the photosensitive layer of electrophotographic photoreceptors. For example, Japanese Pat. Exam. Pub. No. 10496/1975 discloses an organic photoreceptor having a photosensitive layer containing polyvinylcarbazole and trinitrofluorenone. This photoreceptor, however, is not sufficient in sensitivity and durability. Taking notice of this, there are developed electrophotographic photoreceptors of function-separated type which assign the carrier generation function and the carrier transport function to different substances separately.

These function-separated electrophotographic photoreceptors allow materials to be selected appropriately from a broad range; therefore, objective properties are obtained relatively easily, and development of an organic photoreceptor of high sensitivity and excellent durability is expected.

There are proposed various organic materials as a carrier generation material or a carrier transport material in such function-separated electrophotographic photoreceptors. And the carrier generation substance has a particularly important function which controls basic properties of a photoreceptor. As such carrier generation substances, there have been practically used photoconductive substances such as polycyclic quinones represented by dibromoanthanthrone, pyrylium compounds and eutectic complexes thereof, squarium compounds, phthlocyanine compounds and azo compounds. Since the carrier generation substance is coated in the form of dispersion or solution of an organic solvent in general, a good dispersibility and high dispersion stability are required of a carrier generation substance to obtain good electrophotographic photoreceptors.

Further, a carrier generation substance having a high carrier generation efficiency is also necessary to impart a high sensitivity to an electrophotographic photoreceptor. In this connection, phthalocyanine compounds absorb much attention in recent years and are actively studied as a material to meet such necessity.

It is known that characteristics of the phthalocyanine compound including spectrum and photoconductivity vary according to types of central metals and crystal forms. For example, it is reported, in "Senryo to Yakuhin" (Dyes and Related Chemicals) by M. Sawata, 24 (6), p. 122 (1979), that copper phthalocynine has four crystal forms: $\alpha$, $\beta$, $\gamma$ and $\epsilon$, and that its electrophotographic characteristics vary depending upon the crystal forms.

Titanylphthalocyanine, which is particularly interested recently, is also reported to have four crystal forms of types A, B, C and Y. Titanylphthalocyanine of type A described in Japanese Pat. O.P.I. Pub. No. 67094/1987, type B in Japanese Pat. O.P.I. Pub. No. 239248/1986 and type C in Japanese Pat. O.P.I. Pub. No. 256865/1987 are still insufficient in electrophotographic sensitivity and durability.

Titanylphthalocyanine of type Y made known recently in "Japan Hardcopy '89" by Kinoshita et al., EP 26 (1989) has a high sensitivity; for utilizing its high characteristics practically by making its dispersion stably and finely, it is essential to develop a new technique to prepare its dispersion.

SUMMARY OF THE INVENTION

The object of the present invention is to provide an electrophotographic photoreceptor excellent in stability of the coating solution and manufacturing method thereof.

The above object of the invention is attained by an electrophotographic photoreceptor comprising a conductive support having thereon a photoreceptive layer containing a binder, a titanylphthalocyanine represented by the following formula II, which has a peak in X-ray diffraction spectrum thereof by Cu-K$\alpha$ ray at a Bragg angle $2\theta$ of $27.2° \pm 0.2°$, and a phthalocyanine represented by the following formula I;

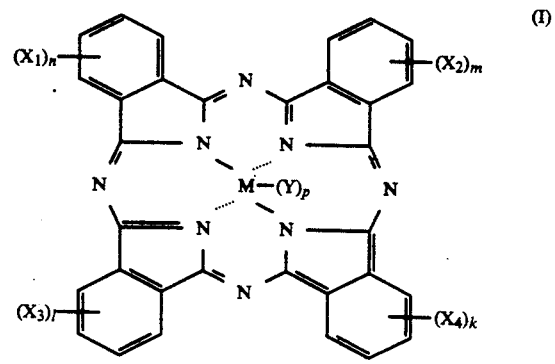

(I)

wherein $X_1$, $X_2$, $X_3$ and $X_4$ are each an alkyl group, an alkoxy group or a an aryloxy group, these groups each may have a substituent; M is a metal atom; Y is a halogen atom, an oxygen atom, a hydroxy group, an alkoxy group, an aryloxy group, an alkylthio group, an arylthio group, or a siloxy group, these organic groups may have a substituent; k, l, m and n are each an integer of 0, 1, 2, 3 or 4; and p is an integer of 0, 1 or 2;

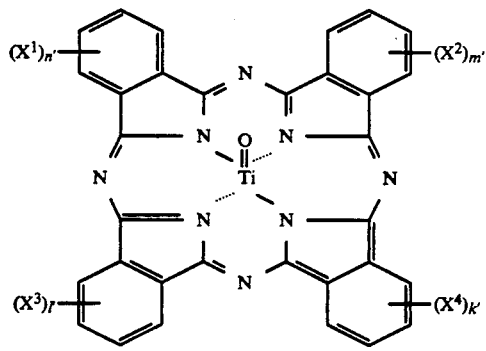

wherein $X^1$, $X^2$, $X^3$ and $X^4$ are each a hydrogen atom, a halogen atom, an alkyl group or an alkoxy group; and n', m', l' and k' are each an integer of 0, 1, 2, 3 to 4. The photoreceptor of the invention is manufactured by a method comprising the steps of dispersing the above-mentioned titanylphthalocyanine represented by formula II and an organic solvent soluble phthalocyanine represented by formula I in a solution of a binder to form a coating solution; and coating the coating solution on a conductive support.

The X-ray diffraction spectrum was measured under the following conditions, and the peak means a clear projection of sharp angle which differs from noises.

| X-ray vessel | Cu |
| --- | --- |
| Voltage | 40.0 KV |
| Current | 100 mA |
| Start angle | 6.0 deg. |
| Stop angle | 35.0 deg. |
| Step angle | 0.02 deg. |
| Measuring time | 0.50 sec. |

BRIEF DESCRIPTION OF THE DRAWING

FIGS. 13 and 15 are an absorption spectrum and IR spectrum of the phthalocyanine derivative obtained in synthesis 2, respectively.

DETAILED DESCRIPTION OF THE INVENTION

Figure 1:
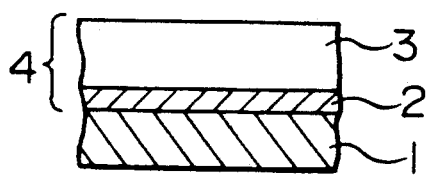
FIGS. 1 to 6 are sectional views showing typical examples of the layer configuration of the photoreceptor according to the invention.

Various methods can be used to synthesize the titanylphthalocyanine used in the invention, but typically it is synthesized according to the following reaction formula (1) or (2).

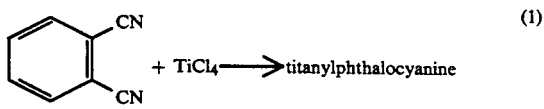

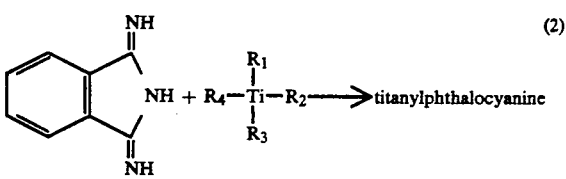

In the formulas, $R_1$ to $R_4$ each represent a group capable of being released upon the above reaction.

The titanylphthalocyanine obtained as above can be converted into the crystal form used in the invention by subjecting it to the following treatment.

For example, a titanylphthalocyanine of any crystal form is dissolved in a concentrated sulfuric acid, and the sulfuric acid solution is poured into water to precipitate crystals, which are then filtered off. In this process, the titanylphthalocyanine is converted into an amorphous state.

Subsequently, this amorphous titanylphthalocyanine is treated with an organic solvent in the presence of moisture to obtain the crystal form used in the invention. Usable organic solvent includes aliphatic hydrocarbons, aromatic hydrocarbons, halogenized hydrocarbons, ketones, esters, ethers, alcohols and heterocyclic compounds. But the method for converting the crystal form is not limited to the foregoing.

An phthalocyanine represented by formula I, hereinafter referred as phthalocyanine of the invention, has a substituent capable of increasing the solubility of the phthalocyanine in the organic solvent on the phthalocyanine ring. As the substituent, an alkyl group, an alkoxy group and an aryloxy group are particularly effective. Although there is no limitation on the central atom of the phthalocyanine, a 3- or 4-valence metal atom such as aluminum, gallium, indium, titanium, vanadium, zirconium, tin, manganese, silicon and germanium, is preferable.

The phthalocyanines of the invention can be synthesized by a known method described in 'PHTHALOCYANINE COMPOUND' BY Moser and Thomas. In the method, for example, a metal phthalocyanine is obtained by a reaction o-phthalonitril or 1,3-diiminoisoindolin with a metal salt in an inactive solvent such as α-chloronaphthalene.

Examples of phthalocyanine to be used in the invention are as follows:

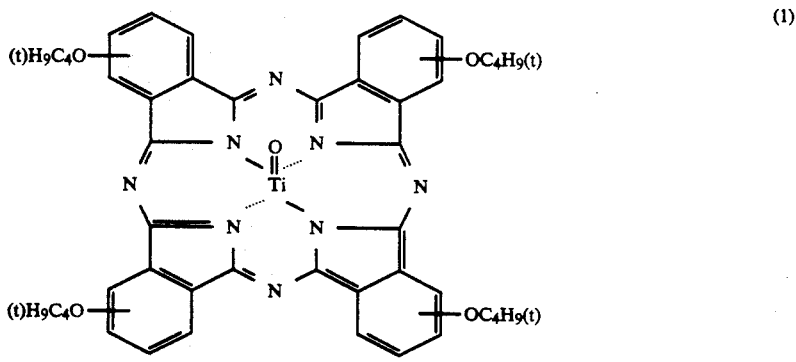
(1)
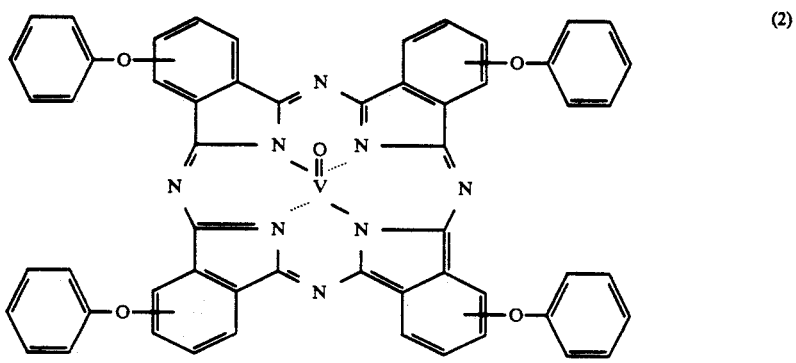
(2)
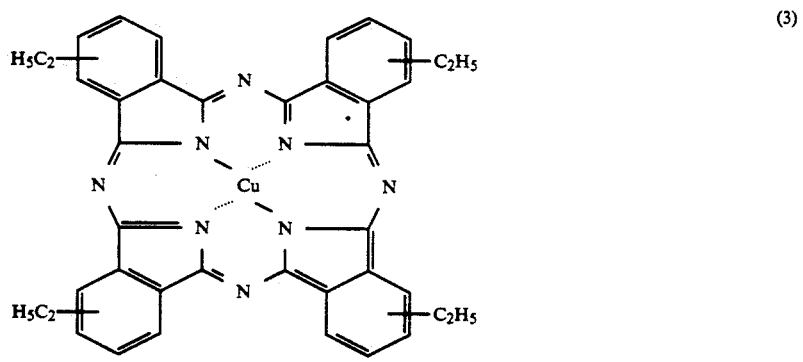
(3)
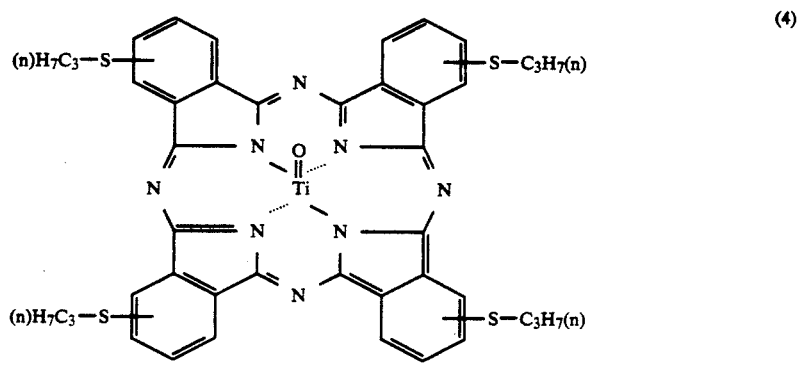
(4)

-continued
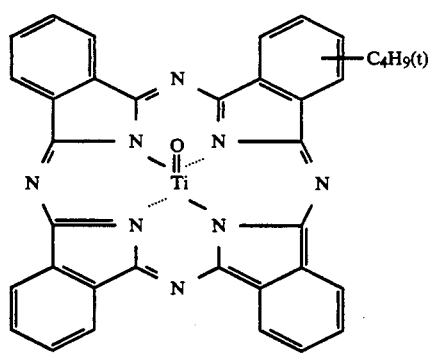
(5)
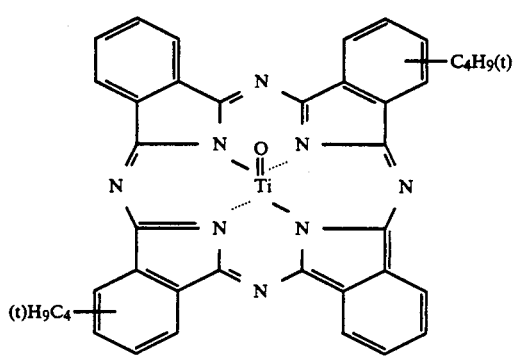
(6)
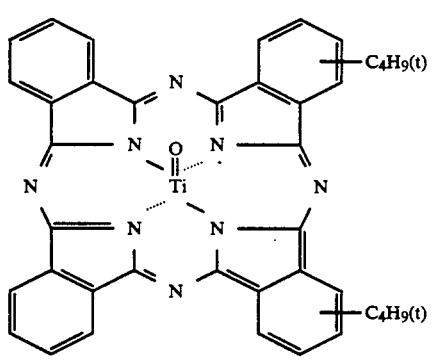
(7)
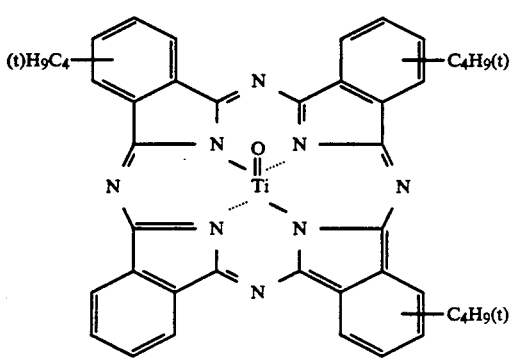
(8)

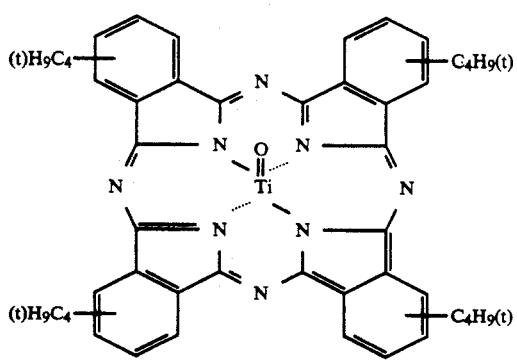
(9)
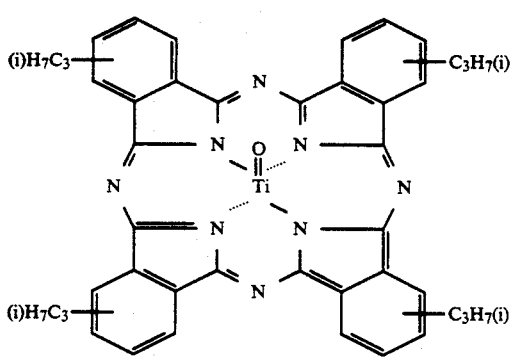
(10)
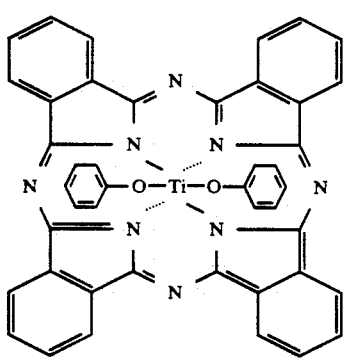
(11)
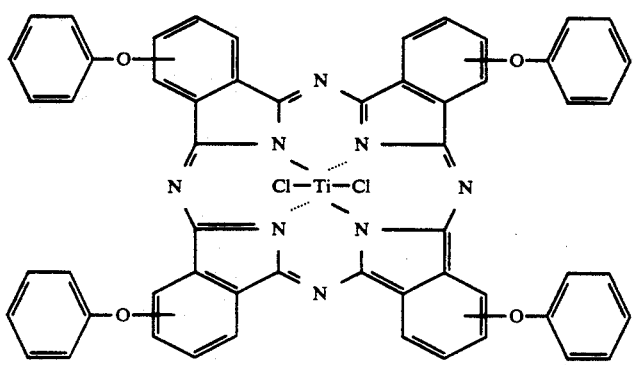
(12)

-continued
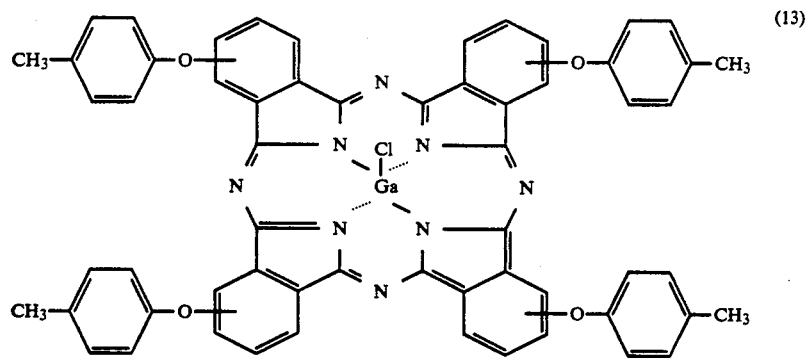
(13)
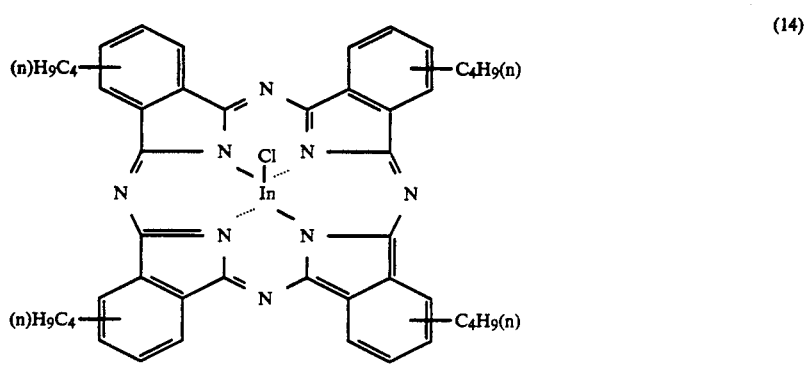
(14)
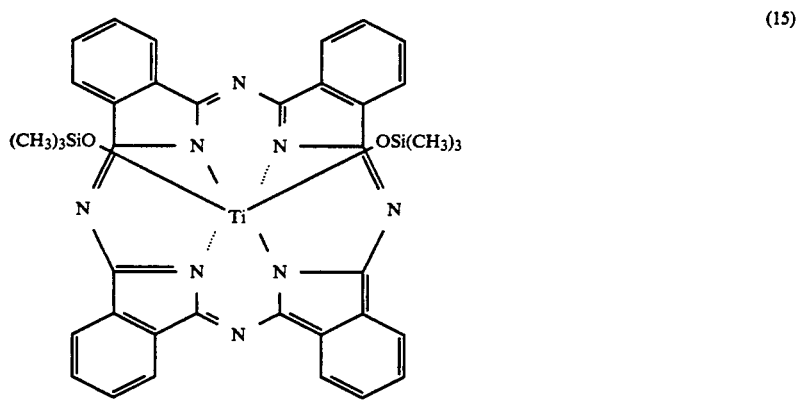
(15)
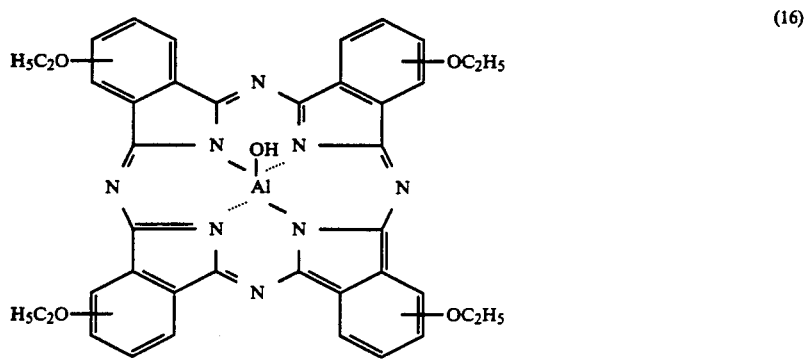
(16)

-continued

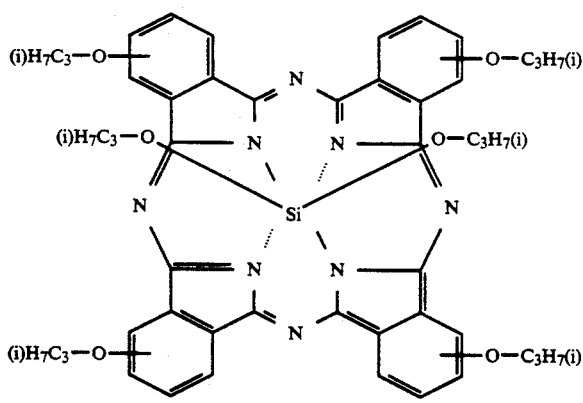
(17)

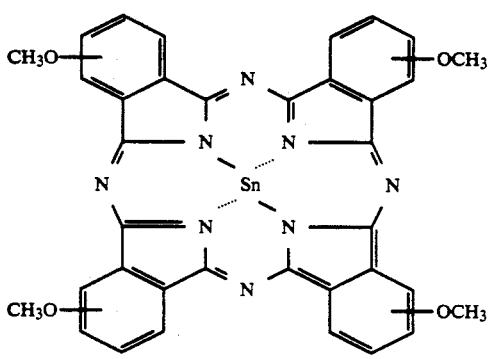
(18)

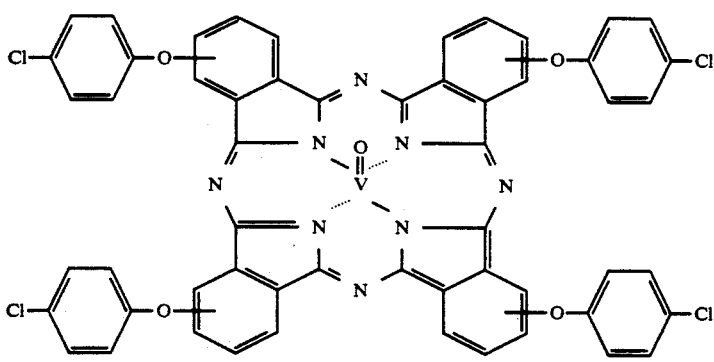
(19)

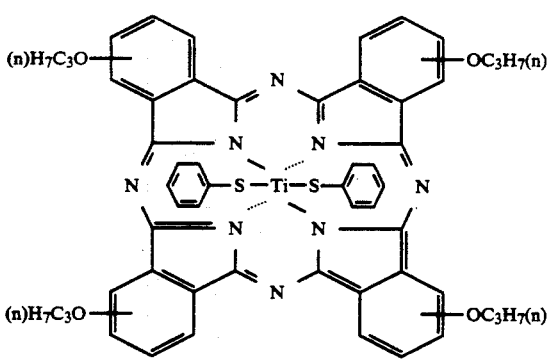
(20)

The electrophotographic photoreceptor according to the invention is formed by coating, on a substrate, a coating solution which comprises a binder solution dispersing therein the titanylphthalocyanine of the invention and a soluble phthalocyanine. There is no particular limitation on the method for incorporating a phthalocyanine of the invention in a coating solution of the titanylphthalocyanine having a specific crystal form of the invention. For example, these compounds may be mixed in a solid state, or a phthalocyanine may be added to a dispersion of the titanylphthalocyanine.

Further, these may be mixed by steps of making up respective phthalocyanines into uniformly dissolved states, allowing them to form mixed crystals or complexes, and then dispersing them.

The mixing ratio of a phthalocyanine of the invention to a titanylphthlocyanine of the invention is usually 0.0001 wt % to 100 wt %, desirably 0.001 to 50 wt % and more desirably 0.01 to 20 wt %.

In addition to these phthalocyanines, there may be contained other photoconductive substances in the electrophotographic photoreceptor of the invention.

Examples of such other photoconductive substances include titanylphthalocyanines different in crystal forms from the titanylphthalocyanine of the invention, such as types A, B and C, amorphous titanylphthalocyanines, and mixtures thereof including a mixture of types A and B; other phthalocyanine compounds; naphthalocyanine compounds; porphyrin compounds; azo compounds; polycyclic quinone compounds represented by dibromoanthanthrone; pyrylium compounds and eutectic complexes thereof; and squarium compounds.

In the electrophotographic photoreceptor of the invention, a carrier transport substance may be used jointly with the carrier generation substance.

While various substances can be used as the carrier transport substance, typical ones are nitrogen-containing heterocyclic nuclei such as oxazole, oxaziazole, thiazole, thiaziazole and compounds having a condensed ring thereof; polyarylalkane compounds; pyrazoline compounds; hydrazone compounds; triazoleamine compounds; styryl compounds; polys(bis)styryl compounds; styryltriphenylamine compounds; β-phenylstyryltriphenylamine compounds; butadiene compounds; hexatriene compounds; carbazole compounds; and condensed polycyclic compounds.

Typical examples of such carrier transport substances can be seen in Japanese Pat. O.P.I. Pub. No. 107356/1986; among them, representative ones are illustrated below.

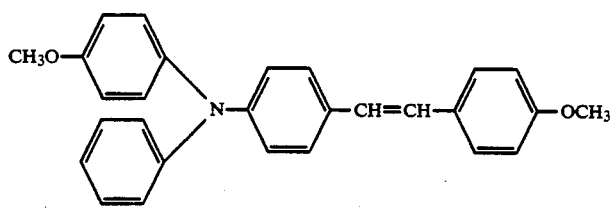

(1)

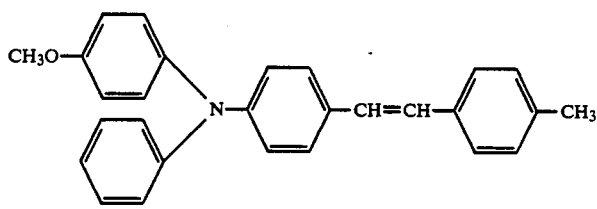

(2)

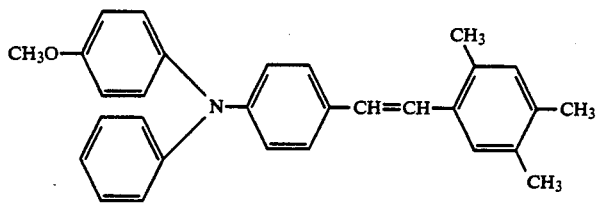

(3)

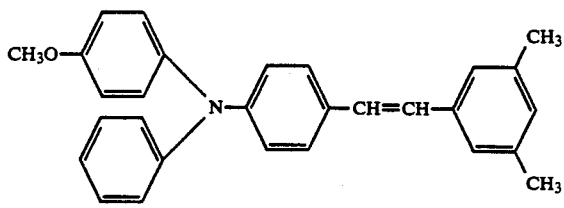

(4)

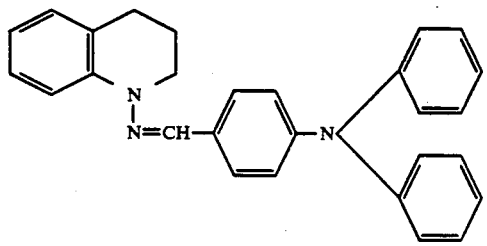

(5)

-continued
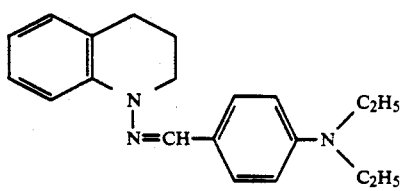
(6)
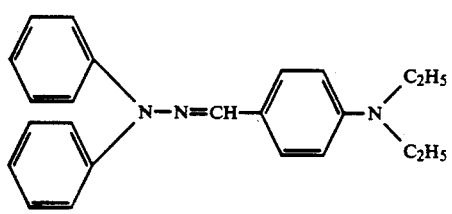
(7)
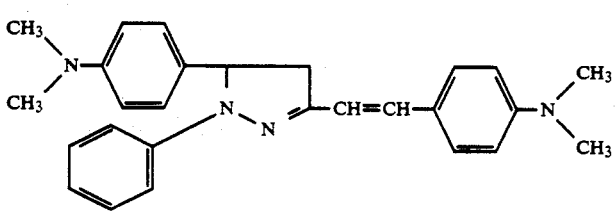
(8)
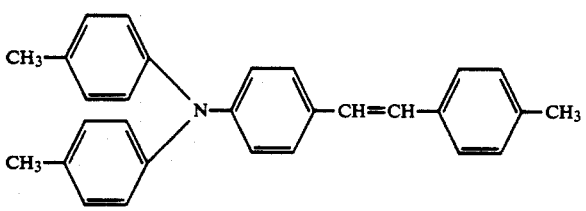
(9)
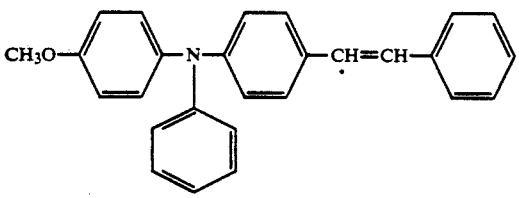
(10)
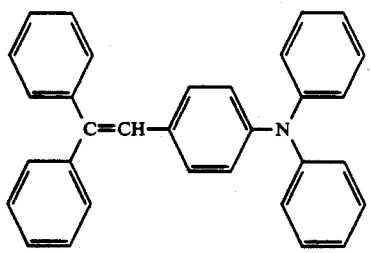
(11)
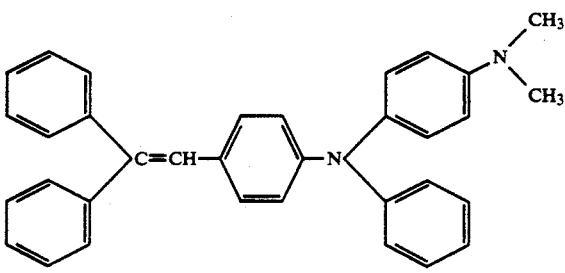
(12)

-continued
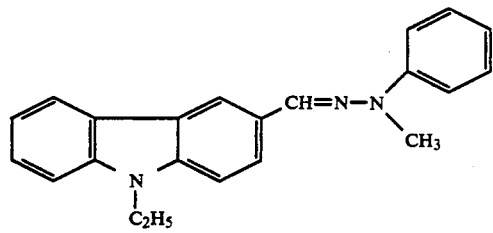  (13)
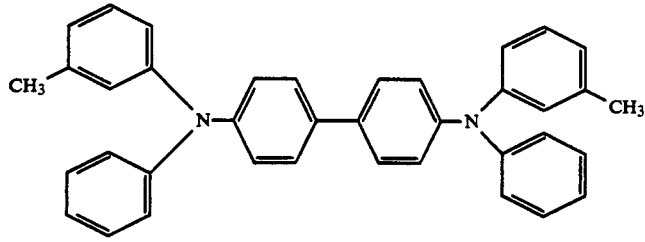  (14)
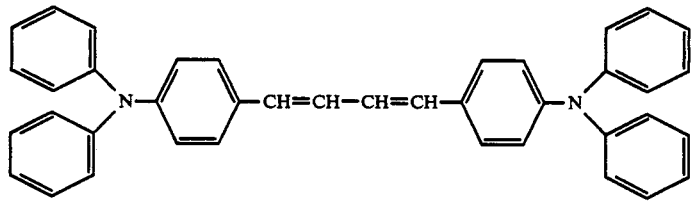  (15)
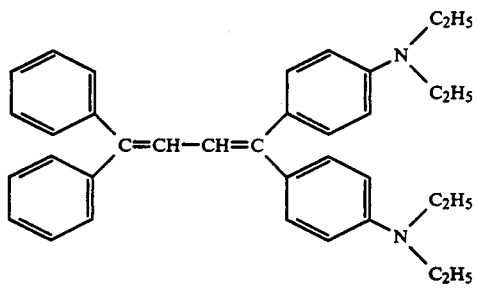  (16)
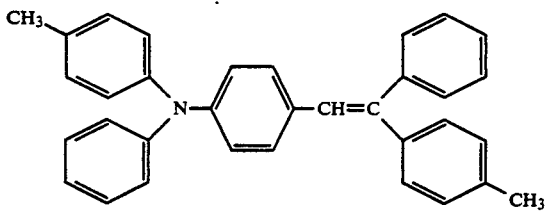  (17)
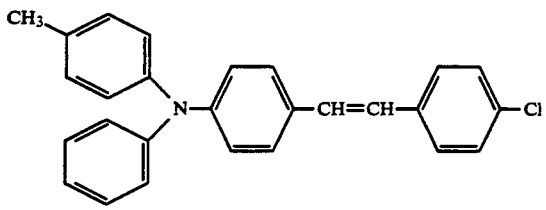  (18)
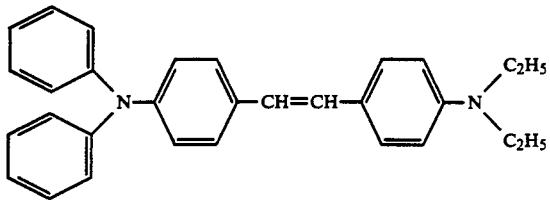  (19)

-continued

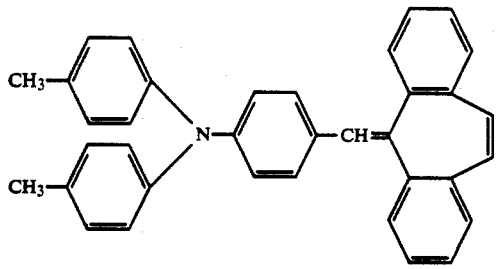
(20)

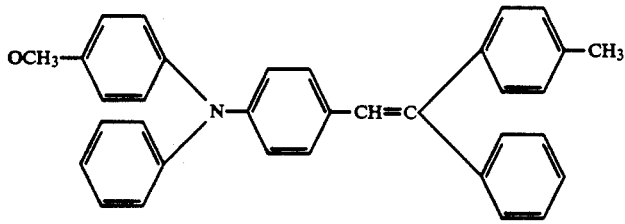
(21)

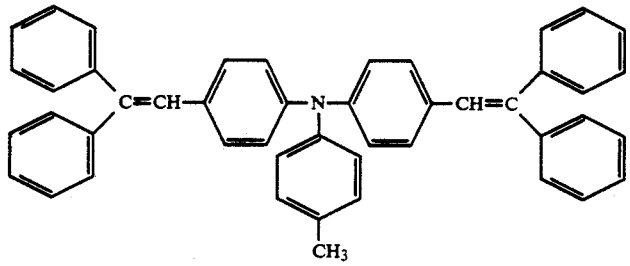
(22)

As the layer configuration of photoreceptors, various types are known in the art.

Figure 2:
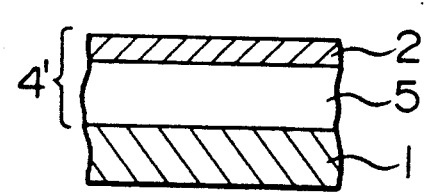
Figure 3:
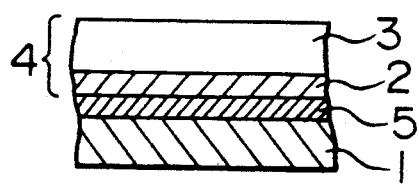
Figure 4:
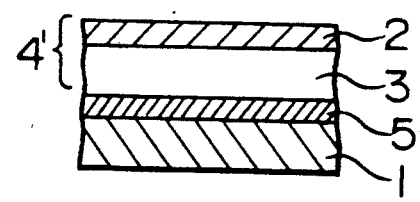
Figure 5:
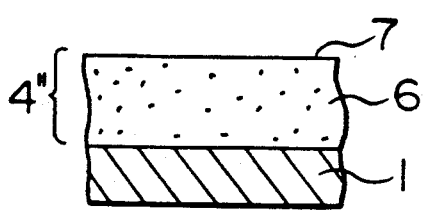
Figure 6:
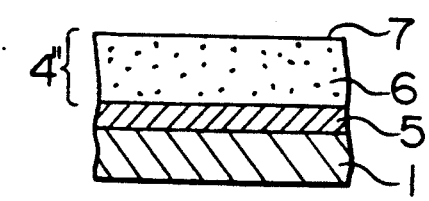

While the present invention can use any of the layer configurations, it is preferable that the photoreceptor be formed into a function-separated photoreceptor of laminated-type or dispersed-type shown in FIGS. 1 to 6. The layer configuration shown in FIG. 1 is given by forming, on electroconductive support 1, carrier generation layer 2 containing a titanylphthalocyanine and a soluble phthalocyanine according to the invention, and laminating thereon carrier transport layer 3 to form photosensitive layer 4. In FIG. 2, carrier generation layer 2 and carrier transport layer 3 are provided in the reverse order to form photosensitive layer 4'. In FIG. 3, intermediate layer 5 is provided between photoconductive layer 4 and electroconductive support 1 shown in the layer configuration of FIG. 1. The layer configuration of FIG. 5 is given by forming photosensitive layer 4" containing the carrier generation substance of the invention 6 and carrier transport substance 7. In FIG. 6, intermediate layer 5 is provided between said photosensitive layer 4" and electroconductive support 1. In the layer configurations of FIGS. 1 to 6, a protective layer may be provided on the uppermost layer.

A useful method of forming a photosensitive layer is to coat a solution dissolving or dispersing a carrier generation substance or a carrier transport substance singly or together with a binder and additives.

However, carrier generation of the invention substances are generally low in solubility. Accordingly, it is advantageous to coat a dispersion prepared by dispersing a carrier generation substance as fine particles in a suitable dispersion medium with a dispersing apparatus such as a supersonic disperser, ball mill, sand mill or homogenizer. In this case, a binder and other additives are generally added to such a dispersion.

As a solvent or dispersing medium used in forming a photosensitive layer, there may be employed various compounds such as butylamine, ethylenediamine, N,N-dimethylformamide, acetone, methyl ethyl ketone, methyl isopropyl ketone, methyl isobutyl ketone, cyclohexanone, 4-methoxy-4-methyl-2-pentanone, tetrahydrofuran, dioxane, ethyl acetate, butyl acetate, t-butyl acetate, methyl cellosolve, ethyl cellosolve, buthyl cellosolve, ethylene glycol dimethylether, toluene, xylene, acetophenone, chloroform, dichloromethane, dichloroethane, trichloroethane, methanol, ethanol, propanol and butanol.

The binder used in forming a carrier generation layer or a carrier transport layer may be arbitrarily selected, but hydrophobic high polymers having a film forming capability are preferred. Examples of these polymers are illustrated below.

Polycarbonate resins
Polycarbonate Z resins
Acrylic resins
Methacrylic resins
Polyvinyl chlorides
Polyvinylidene chlorides
Polystyrenes
Styrene-butadien copolymers
Polyvinyl acetates
Polyvinyl formals
Polyvinyl butyrals
Polyvinyl acetals
Polyvinylcarbazoles
Styrene-alkyd resins Silicone resins
Silicone-alkyd resins
Silicone-butyral resins
Polyesters
Polyurethanes
Polyamides Epoxy resins
Phenolic resins
Vinylidene chloride-acrylonitrile copolymers
Vinyl chloride-vinyl acetate copolymer
Vinyl chloride-vinyl acetate-maleic anhydride copolymers The addition ratio of the carrier generation substance, i.e. a titanylphthalocyanine of the invention, to the binder is desirably 10 to 600 wt % and more desirably 50 to 400 wt %. The addition ratio of the carrier transport substance to the binder is desirably 10 to 500 wt %. The thickness of the carrier generation layer is 0.01 to 20 μm and preferably 0.05 to 5 μm. The thickness of the carrier transport layer is 1 to 100 μm and preferably 5 to 30 μm.

The above photosensitive layer may contain an electron accepting substance for enhancing the sensitivity, decreasing the residual voltage and lessening the fatigue in a repeated use. Examples of such electron accepting substances include succinic anhydride, maleic anhydride, dibromosuccinic anhydride, phthalic anhydride, tetrachlorophthalic anhydride, tetrabromophthalic anhydride, 3-nitrophthalic anhydride, 4-nitrophthalic anhydride, pyromellitic anhydride, mellitic anhydride, tetracyanoethylene, tetracyano quinodimethane, o-dinitrobenzene, m-dinitrobenzene, 1,3,5-trinitrobenzene, p-nitrobenzonitrile, picryl chloride, quinonechloroimide, chloranil, bromanil, dichlorodicyano-p-benzoquinone, anthraquinone, dinitroanthraquinone, 9-fluorenylidenemalonodinitrile, polynitro-9-fluorenylidene-malonodinitrile, picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid, mellitic acid and other compounds having a large electron affinity. The addition amount of the electron accepting substance is desirably 0.01 to 200 parts, more desirably 0.1 to 100 parts by weight per 100 parts by weight of the carrier generation substance.

In order to improve the preservability, durability and anti-environmental dependency, the photosensitive layer may contain deterioration inhibitors such as antioxidants and light-stabilizers. The compounds used for such purposes are, for example, chromanol derivatives and ethers or esters thereof such as tocopherol; polyarylalkane compounds; hydroquinone derivatives and mono or dithers thereof; benzophenone derivatives; benzotriazole derivatives; thioether compounds; phosphonates; phosphites; phenylenediamine derivatives; phenol compounds; hindered phenol compounds; straight chain amines; cyclic amines; and hinderd amines. Typical examples of particularly useful compounds are hindered phenol compounds such as those available by names of Irganox 1010, Irganox 565 (products of Ciba Geigy), Sumilizer BHT, Sumilizer MDP (products of Sumitomo Chemical) and hindered amine compounds such as those available by names of Sanol LS-2626 and Sanol LS-622LD (products of Sankyo).

As the binder for the intermediate layer and protective layer, binders used in the above carrier generation layer and carrier transport layer can be employed. In addition, there may be used other types of binders such as nylon resins; ethylene-type resins including ethylene-vinyl acetate copolymers, ethylene-vinyl acetate-maleic anhydride copolymers and ethylene-vinyl acetate-methacrylic acid copolymers; polyvinyl alcohols; and cellulose derivatives. Curable binders which utilize a thermosetting or chemical curing function of melamine, epoxides or isocyanates may also be used.

Electroconductive supports suitable for the invention are metal plates and metal drums, as well as ones prepared by forming a thin film of an electroconductive polymer, electroconductive compound such as iridium oxide or metal such as aluminium or palladium, on a paper or plastic film substrate by means of coating, deposition or lamination.

EXAMPLES

Example 1-1

Figure 7:
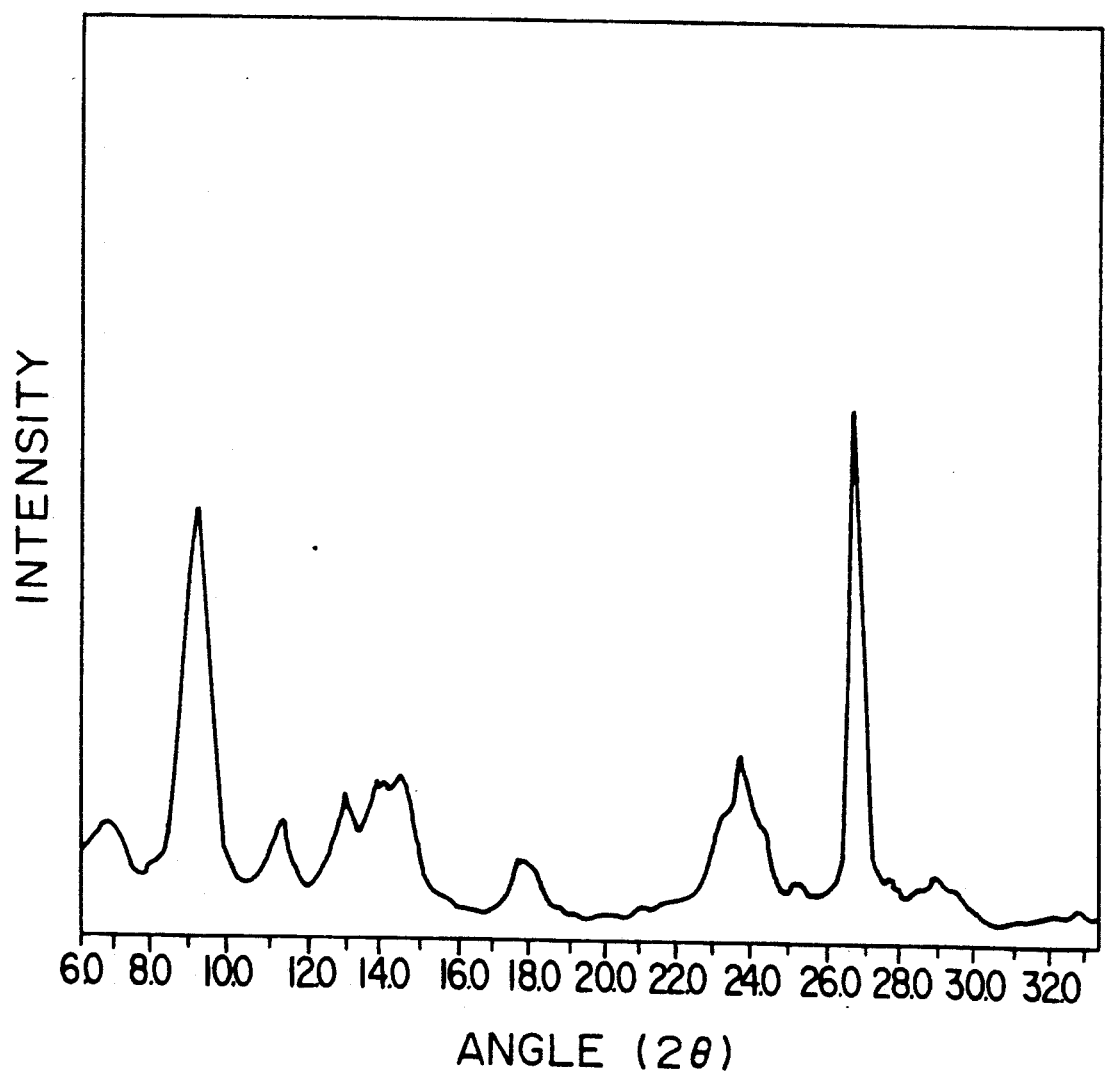
FIGS. 7 to 11 are X-ray diffraction spectral maps of titanylphthalocyanines used in the invention.
Figure 8:
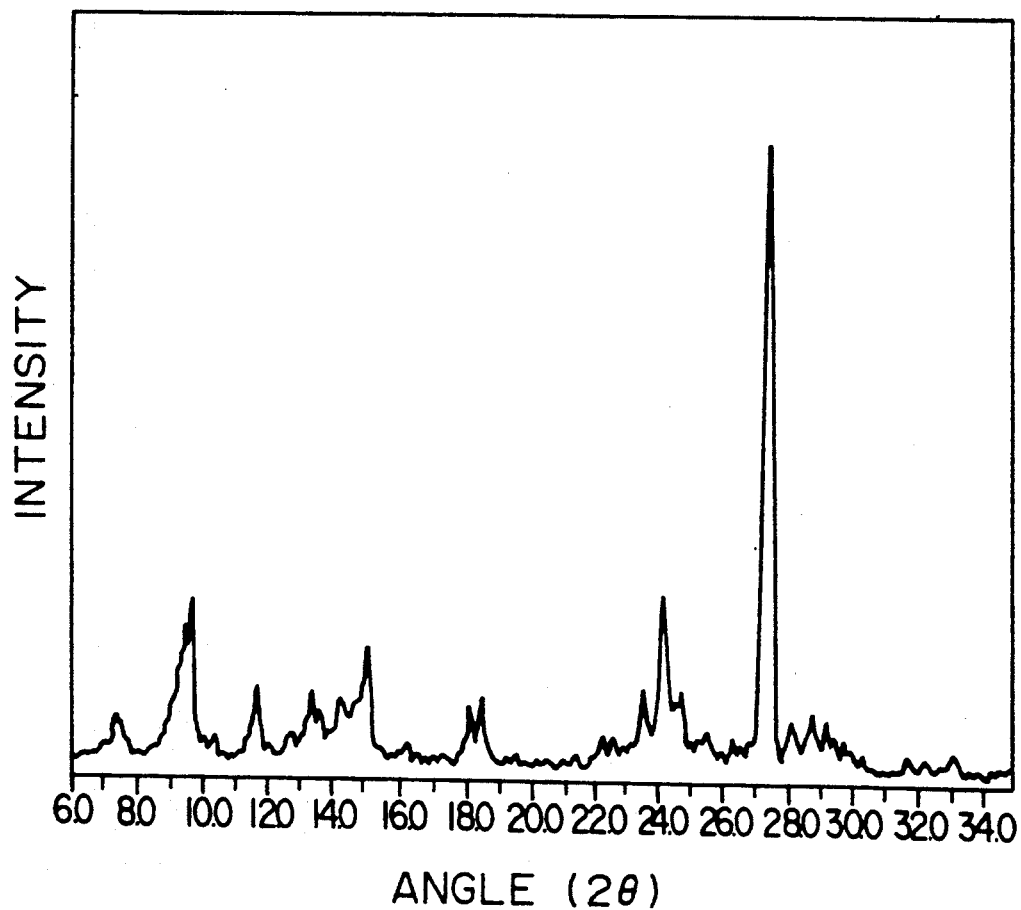
Figure 9:
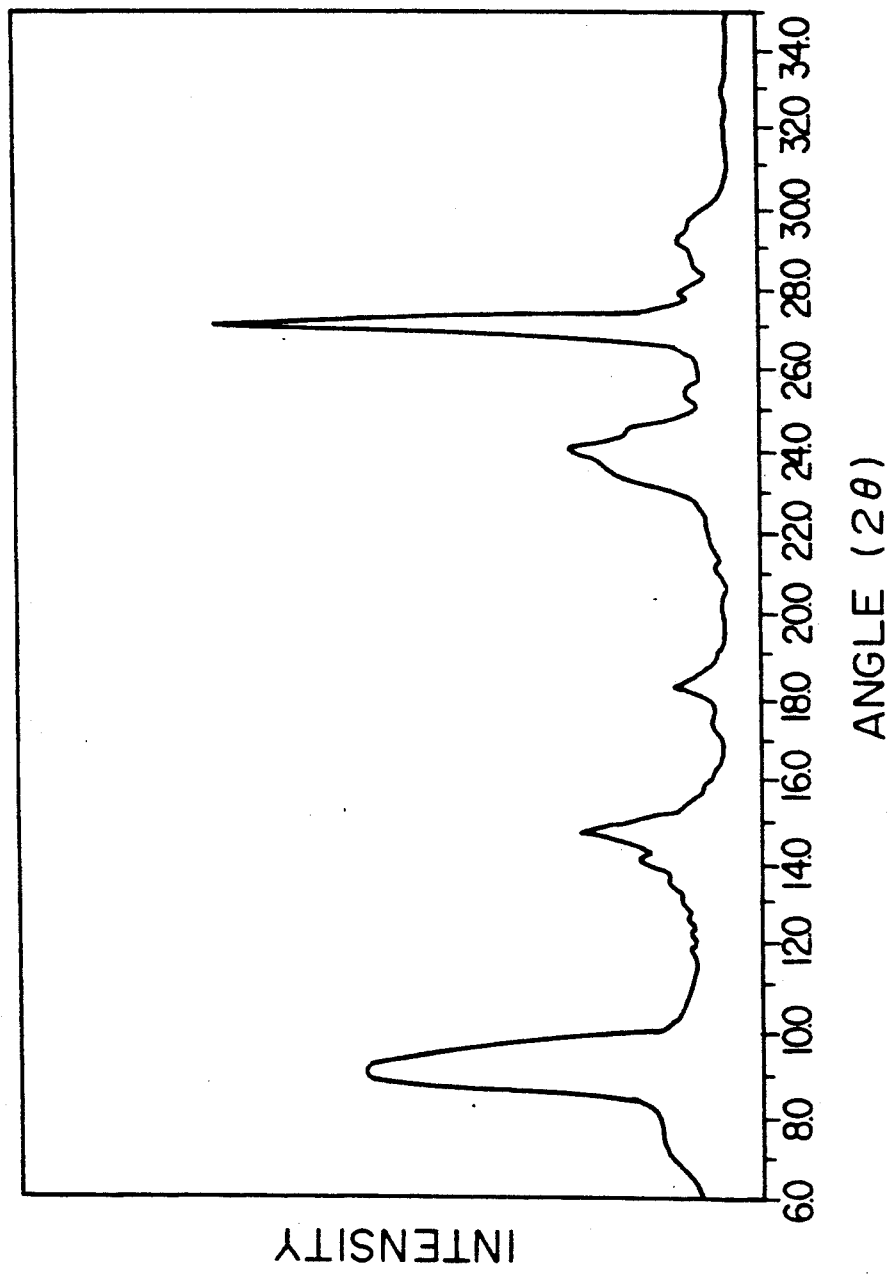
Figure 10:
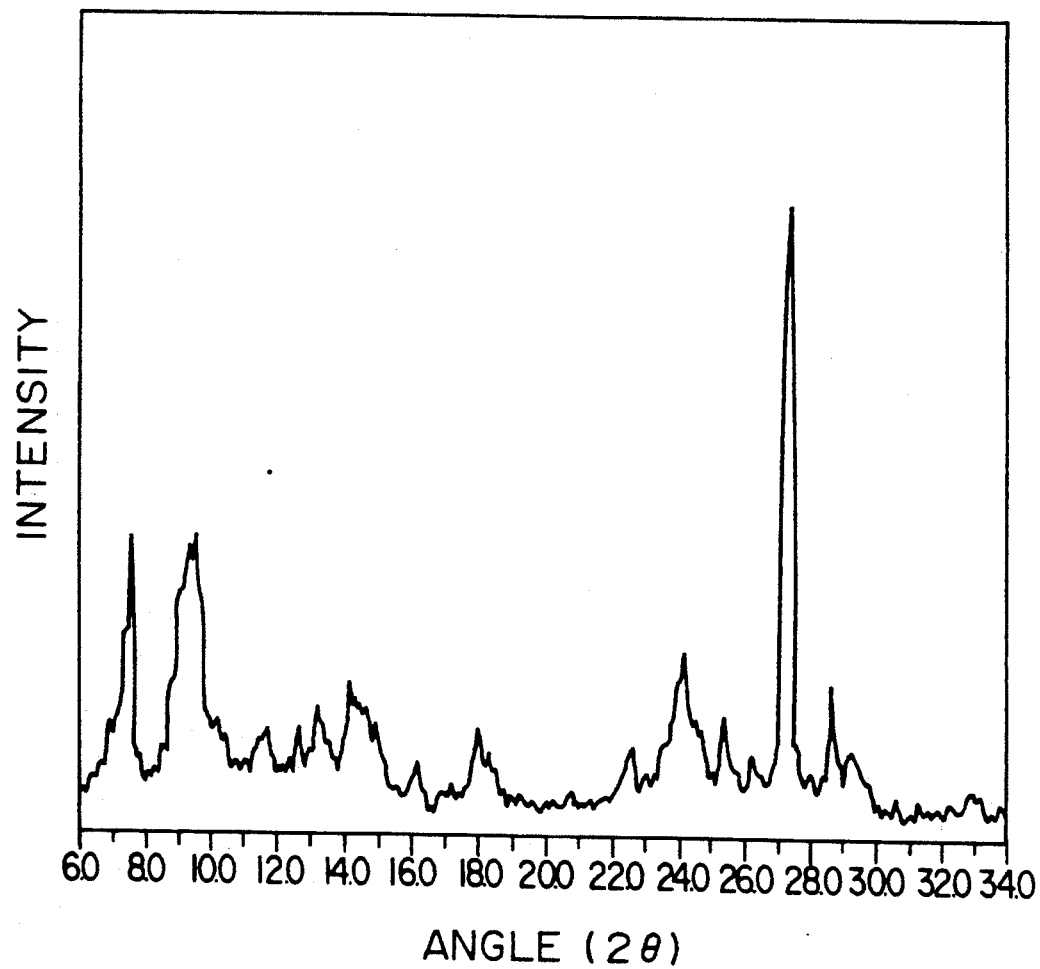

A dispersion was prepared by dispersing, with a sand mill, 1 part of titanylphthalocyanine of the invention shown in FIG. 7 and having a characteristic peak at a Bragg angle (2θ) of 27.2°, 0.01 part of tetra-t-butyl-titanylphthalocyanine, 1 part of silicone resin (KR-5240, 15% xylenebutanol solution, product of Shin-Etsu Chemical) as the binder resin and 100 parts of methyl ethyl ketone as the dispersion medium. The dispersion was coated on an aluminium-deposited polyester base using a wire bar to form a 0.2-μm thick carrier generation layer.

Next, there was coated thereon, with a blade coater, a solution dissolving 1 part of exemplified carrier transport substance (1), 1.3 parts of polycarbonate resin (Eupiron Z200 made by Mitsubishi Gas Chemical) and a small amount of silicone oil (KF-54 made by Shin-Etsu Chemical) in 10 parts of 1,2-dichloroethane to form a 20-μm thick carrier transport layer. The photoreceptor prepared as above is referred to as sample 1.

Example 1-2

A photoreceptor was prepared in the same procedure as in Example 1-1, except that the dispersion obtained in Example 1-1 was allowed to stand in the dark at 60° C. for 1 month and then used. This is referred to as sample 1'.

Example 2-1

A photoreceptor was prepared in the same procedure as in Example 1-1, except that tetraphenoxyvanadylphthalocyanine 2 was used instead of tetra-t-butyl-titanylphthalocyanine. This is referred to as sample 2.

Example 2-2

A photoreceptor was prepared in the same procedure as in Example 2-1, except that the dispersion obtained in Example 2-1 was allowed to stand in the dark for 1 month as in Example 1-2 and then used. This is referred to as sample 2'.

Example 3-1

A photoreceptor was prepared in the same procedure as in Example 1-1, except that tetrabutyltitanylphthalocyanine was used in amount of 0.05 part instead of 0.01 part. This is referred to as sample 3.

Example 3-2

A photoreceptor was prepared in the same procedure as in Example 3-1, except that the dispersion obtained in Example 3-1 was allowed to stand in the dark for 1 month as in Example 1-2 and then used. This is referred to as sample 3'.

Example 4-1

Figure 11:
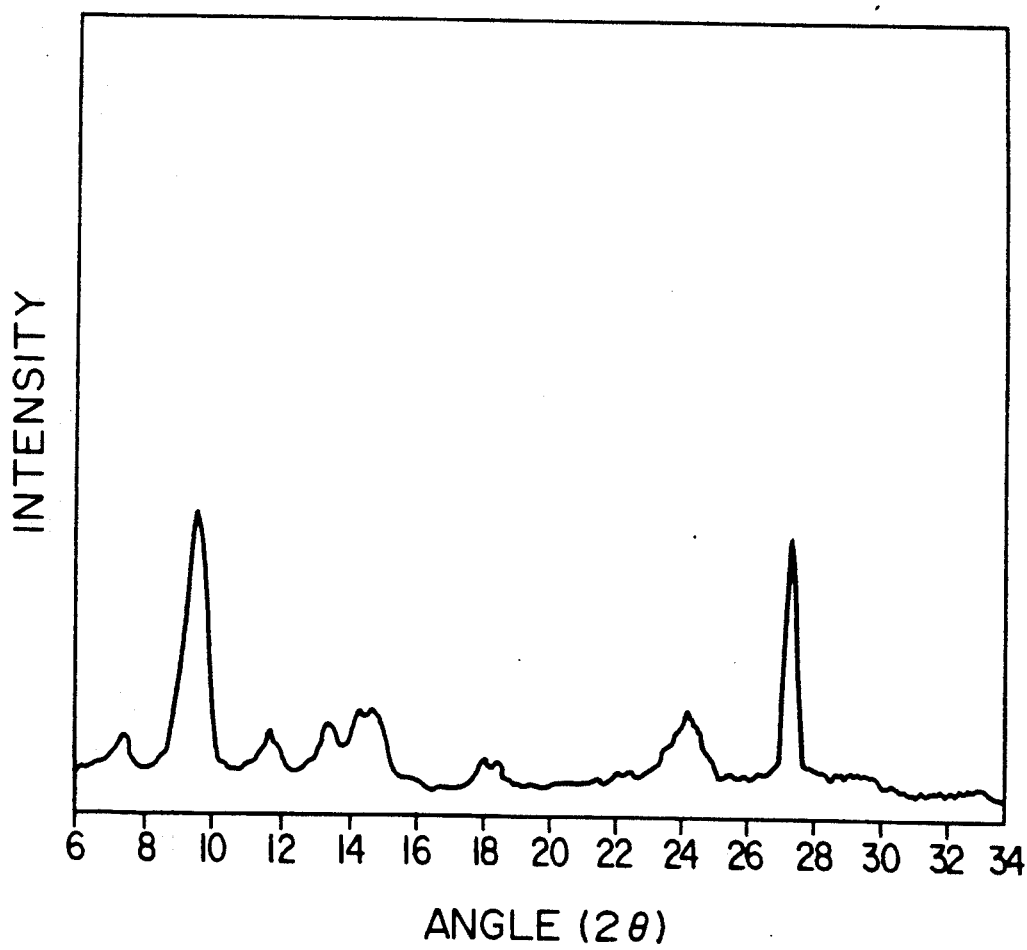

A photoreceptor was prepared in the same procedure as in Example 1-1, except that the titanylphthalocyanine shown in FIG. 11 was used instead of the titanylphthalocyanine shown in FIG. 7 and that exemplified carrier transport substance (22) was used instead of exemplified carrier transport substance (1). This is referred to as sample 4.

Example 4-2

A photoreceptor was prepared after allowing the dispersion obtained in Example 4-1 to stand in the dark for 1 month as in Example 1-2. This is referred to as sample 4'.

Comparison 1-1

A photoreceptor was prepared in the same procedure as in Example 1-1, except that tetra-t-butltitanyl-phthalocyanine 1 was not used. This is referred to as comparative sample 1.

Comparison 1-2

A photoreceptor was prepared after allowing the dispersion obtained in Comparison 1-1 to stand in the dark for 1 month as in Example 1-2. This is referred to as comparative sample 1'.

Evaluation 1

The samples prepared as above were subjected to the following evaluation with a paper analyzer Model EPA-8100 (product of Kawaguchi Electric). First, each sample was subjected to corona electrification for 5 seconds at $-80\ \mu A$ to determine the surface potential immediately after the electrification Va and the surface potential after allowing the sample stand for 5 seconds Vi. Subsequently, the sample was exposed under a condition giving it a surface illumination intensity of 2 (lux) to determine the exposure $E_{\frac{1}{2}}$ necessary to make the surface potential $\frac{1}{2}Vi$ and the exposure $E_{600/100}$ necessary to drop the surface potential from $-600\ V$ to $-100\ V$.

Further, the dark attenuation factor D was determined from the equation $D=100(Va-Vi)/Va\ (\%)$. The results are shown in Table 1.

TABLE 1

| Sample No. | Va (V) | Vi (V) | D (%) | E½ (lux·sec) | E600/100 (lux·sec) |
|---|---|---|---|---|---|
| Sample 1 | −1225 | −1000 | 18.4 | 0.33 | 0.39 |
| Sample 1' | −1205 | −985 | 18.3 | 0.34 | 0.40 |
| Sample 2 | −1205 | −980 | 18.7 | 0.37 | 0.40 |
| Sample 2' | −1170 | −940 | 19.7 | 0.37 | 0.41 |
| Sample 3 | −1085 | −870 | 19.8 | 0.36 | 0.43 |
| Sample 3' | −1065 | −840 | 21.2 | 0.38 | 0.44 |
| Sample 4 | −1230 | −1010 | 17.9 | 0.30 | 0.35 |
| Sample 4' | −1200 | −985 | 17.9 | 0.32 | 0.38 |
| Comparative sample 1 | −1185 | −965 | 18.6 | 0.33 | 0.39 |
| Comparative sample 1' | −1080 | −780 | 27.8 | 0.47 | 0.62 |

It can be seen from these results that each coating solution of the invention has an excellent stability.

Example 5

A 0.1-μm thick intermediate layer of vinyl chloride-vinyl acetate copolymer (Ethlec MF-10 made by Sekisui Chemical) was formed on an aluminium drum. Separately, a dispersion was prepared by steps of grinding 1 part of titanylphthalocyanine of the invention having the diffraction spectrum shown in FIG. 7 and 0.01 part of tetra-t-butyltitanylphthalocyanine in a ball mill, adding thereto a mixture of 3 parts of polycarbonate resin (Panlite L-1250), 15 parts of monochlorobenzene and 35 parts of 1,2-dichloroethane, followed by dispersing. After further adding 2 parts of carrier transport substance (1) to the dispersion, it was coated on the foregoing intermediate layer by the dipping method and dried, so that a 20-μm thick photosensitive layer was formed. The photoreceptor prepared as above is referred to as sample 5.

In addition, a photoreceptor was prepared after allowing the above dispersion to stand for 1 month as in Example 1-2. This is referred to as sample 5'.

Comparison 2

A photoreceptor was prepared in the same manner as in Example 5, except that tetra t-butyltitanylphthalocyanine 1 was not used. This photoreceptor is referred to as comparative sample 2, and a photoreceptor prepared after allowing the dispersion to stand for 1 month is referred to as comparative sample 2'.

Samples prepared as above were evaluated in the same way as in evaluation 1, except that a positive polarity was used as the electrification polarity. The results are shown in Table 2.

TABLE 2

| Sample No. | Va (V) | Vi (V) | D (%) | E½ (lux·sec) | E600/100 (lux·sec) |
|---|---|---|---|---|---|
| Sample 5 | 1300 | 1040 | 20.0 | 0.45 | 0.58 |
| Sample 5' | 1270 | 1010 | 20.5 | 0.45 | 0.60 |
| Comparative sample 2 | 1305 | 1045 | 19.9 | 0.42 | 0.55 |
| Comparative sample 2' | 1220 | 890 | 27.0 | 0.49 | 0.73 |

The coating solutions of the invention exhibited good preservabilities in the positively electrifying evaluation, too.

What is claimed is:

1. An electrophotographic photoreceptor comprising a conductive support having thereon a photoreceptive layer containing a binder, a titanylphthalocyanine represented by the following Formula II, which has a peak in X-ray diffraction spectrum thereof by Cu-Kα ray at a Bragg angle 2θ of 27.2°±0.2°, and an organic solvent soluble phthalocyanine other than said titanylphthalocyanine and represented by the following Formula I;

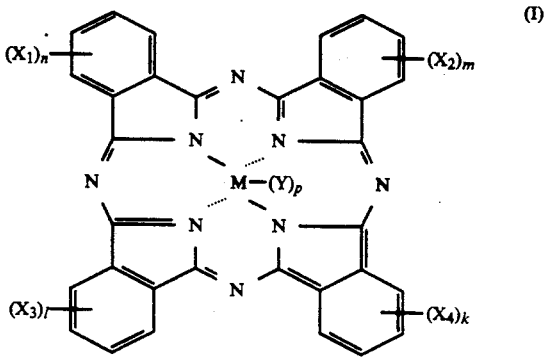

wherein $X_1$, $X_2$, $X_3$ and $X_4$ are each an alkyl group, an alkoxy group or an aryloxy group, these groups each may have a substituent; M is a metal atom; Y is a halogen atom, an oxygen atom, a hydroxy group, an alkoxy group, an aryloxy group, an alkylthio group, an arylthio group, or a siloxy group, these organic groups may have a substituent; k, l, m and n are each an integer of 0, 1, 2, 3 or 4; and p is an integer of 0, 1 or 2, provided that, when k, l, m and n are each 0, Y is an alkoxy group, an aryloxy group, an alkylthio group, or an arylthio group; and, except when p=o, Y is a halogen atom, oxygen atom, or hydroxy group, and at least one of k, l, m and n is not 0;

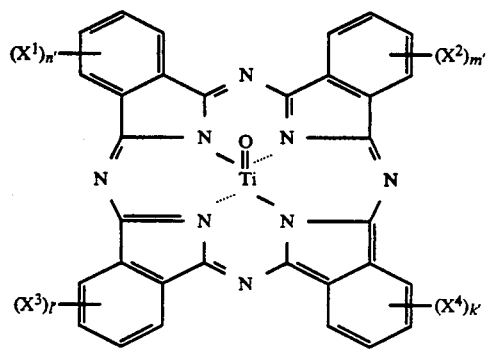

(II)

wherein $X^1$, $X^2$, $X^3$ and $X^4$ are each a hydrogen atom, a halogen atom, an alkyl group or an alkoxy group; and n', m', l', and k' are each an integer of 0, 1, 2, 3 to 4.

2. A photoreceptor of claim 1, wherein said titanylphthalocyanine has peaks in X-ray diffraction spectrum at Bragg angles $2\theta$ of $9.5°\pm0.2°$, $24.1°\pm0.2°$ and $27.2°\pm0.2°$.

3. A photoreceptor of claim 1, wherein said metal atom represented by M in formula I is an aluminum atom, a gallium atom, an indium atom, a titanium atom, a vanadium atom, a zirconium atom, a tin atom, a manganese atom, a silicon atom or a germanium atom.

4. A photoreceptor of claim 1, wherein said phthalocyanine is contained in said photoreceptive layer in a ratio of from 0.001% to 50% of said titanylphthalocyanine by weight.

5. A photoreceptor of claim 4, wherein said phthalocyanine is contained in said photoreceptive layer in a ratio of from 0.01% to 20% of said titanylphthalocyanine by weight.

6. A photoreceptor of claim 1, wherein said photoreceptor further comprises a carrier transport layer comprising a binder and a carrier transport substance.

7. An electrophotographic photoreceptor comprising a conductive support having thereon a photoreceptive layer containing a binder, a titanylphthalocyanine represented by the following formula II, which has peaks in X-ray diffraction spectrum thereof by Cu-Kα ray at a Bragg angle $2\theta$ of $9.5°\pm0.2°$, $24.1°\pm0.2°$ and $27.2°\pm0.2°$, and a phthalo-cyanine other than said titanylphthalocyanine represented by the following formula I;

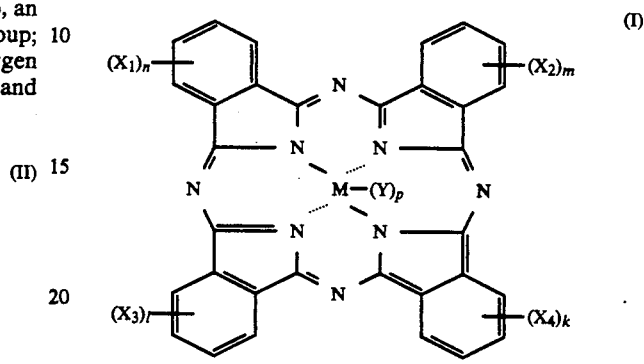

wherein $X_1$, $X_2$, $X_3$ and $X_4$ are each an alkyl group, an alkoxy group or a an aryloxy group, these groups each may have a substituent; M is an aluminum atom, a gallium atom, an indium atom, a titanium atom, a vanadium atom, a zirconium atom, a tin atom, a manganese atom, a silicon atom or a germanium atom; Y is a halogen atom, an oxygen atom, a hydroxy group, an alkoxy group, an aryloxy group, an alkylthio group, an arylthio group, or a siloxy group, these organic groups may have a substituent; k, l, m and n are each an integer of 0, 1, 2, 3 or 4; and p is an integer of 0, 1 or 2;

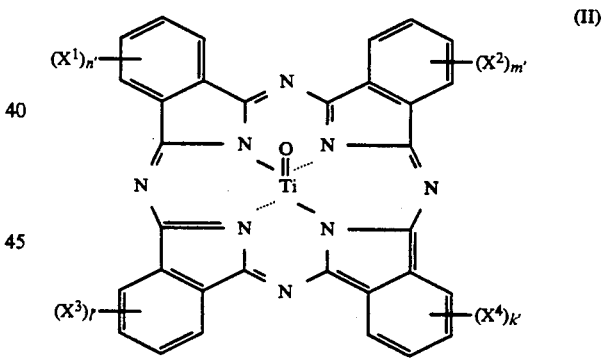

wherein $X^1$, $X^2$, $X^3$ and $X^4$ are each a hydrogen atom, a halogen atom, an alkyl group or an alkoxy group; and n', m', l' and k' are each an integer of 0, 1, 2, 3 to 4.

* * * * *